US006806313B2

(12) United States Patent
Couturier

(10) Patent No.: US 6,806,313 B2
(45) Date of Patent: Oct. 19, 2004

(54) ERUCAMIDE-FREE CLOSURE AND LINER COMPOSITIONS

(75) Inventor: Marysusan Couturier, Framingham, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 10/379,746

(22) Filed: Mar. 5, 2003

(65) Prior Publication Data

US 2004/0176538 A1 Sep. 9, 2004

(51) Int. Cl.$^7$ .................................................. C08L 83/04
(52) U.S. Cl. ........................ 525/100; 524/284; 525/191
(58) Field of Search ................................ 525/100, 191; 524/284

(56) References Cited

U.S. PATENT DOCUMENTS

| | | | | |
|---|---|---|---|---|
| 4,277,431 A | | 7/1981 | Peller | 264/148 |
| 4,462,502 A | | 7/1984 | Luenser et al. | 215/329 |
| 4,518,336 A | | 5/1985 | Alieri | 425/110 |
| 4,870,128 A | * | 9/1989 | Couturier et al. | 524/556 |
| 5,045,594 A | | 9/1991 | Samuel et al. | 525/57 |
| 5,104,710 A | | 4/1992 | Knight | 428/66 |
| 5,186,991 A | | 2/1993 | Samuel et al. | 428/35.8 |
| 5,929,128 A | | 7/1999 | Whetten et al. | 521/85 |
| 6,399,170 B1 | | 6/2002 | Hock et al. | 428/36.6 |

FOREIGN PATENT DOCUMENTS

| | | | |
|---|---|---|---|
| EP | 0073334 | 7/1982 | |
| EP | 0129309 | 4/1984 | |
| EP | 0207385 B1 | 6/1986 | B29C/67/18 |
| EP | 0331495 A1 | 3/1989 | A01N/43/70 |
| EP | 0478109 B1 | 6/1991 | C09K/3/10 |
| EP | 0488491 B1 | 6/1991 | C09K/3/10 |
| EP | 0599356 B1 | 6/1991 | C09K/3/10 |
| EP | 0646158 B1 | 6/1992 | C09K/3/10 |
| WO | 01/062837 A3 | 8/2001 | C08K/5/00 |
| WO | 02/36672 A1 | 5/2002 | C08K/5/20 |

OTHER PUBLICATIONS

Freeman, Silicones—An Introduction To Their Chemistry And Applications, Published for The Plastics Institute, 1962.*

Patent Abstract of Japan: Publication No. 2000–008495 Nov. 01, 2002.

Patent Abstract of Japan. Application No. 01002763 Nov. 01, 1989.

Patent Abstract of Japan. Publication No. 2002–191166 May 7, 2002.

Patent Abstract of Japan. Application No. 2000266018 Jan. 9, 2000.

* cited by examiner

*Primary Examiner*—Kuo-Liang Peng
(74) *Attorney, Agent, or Firm*—Craig K. Leon; William L. Baker

(57) ABSTRACT

An exemplary erucamide-free composition for making container closures or closure sealants includes a matrix polymer, a silicone lubricant such as poly(dimethyl) siloxane, and a slip aid comprising a saturated amide, oxidized polyethylene, or combination thereof.

20 Claims, No Drawings

ERUCAMIDE-FREE CLOSURE AND LINER COMPOSITIONS

FIELD OF THE INVENTION

The present invention relates to compositions for making closures and closure liners, and more particularly to compositions that are free of erucamide.

BACKGROUND OF THE INVENTION

It is known to make container closures and closure sealants using polymers with erucamide as a slip agent. However, erucamides are ethylenically-unsaturated amides that react with ozone that is used for sterilization, thereby creating aldehyde off-tastes that adversely affect beverage products such as carbonated water and soft drinks. However, the use of saturated amides, such as behenamide, while avoiding the off-taste problem, tend to be less effective as slip aids because it is believed that they migrate more slowly to the surface of the matrix polymer and thereby are less efficacious in providing a low-friction surface.

As noted in World Patent WO 0236672A1 of Alphagary Corporation, it was noted that conventional closure sealants for beverage or food containers have utilized lubricants such as erucamide and oleamide, each of which is conjugated. Because these lubricants are conjugated, they are susceptible to photochemical breakdown and oxidative breakdown. In other words, oxidative breakdown of erucamide by ozone sterilization can create flavor-detracting contaminants such as ketones in addition to aldehydes. Ozone sterilization is frequently performed to sterilize bottled water products, such as mineral water and spring water. The United States Food and Drug Administration requires ozone sterilization for sterilizing bottled water products manufactured and sold in the United States. Thus, there is a need for a closure sealant lubricant that is resistant to oxidative breakdown from ozone sterilization. Additionally, there is a need for a closure sealant lubricant that is resistant to photochemiclal breakdown.

Thus, a novel erucamide-free composition is needed for making container closures and closure sealants.

SUMMARY OF THE INVENTION

In surmounting the problems noted above, the present invention provides a composition, suitable for container closures and closure sealants, comprising: (A) a matrix polymer, copolymer, or blend of polymer and/or copolymers, which is essentially free of erucamide and which is essentially free of unsaturated amide; (B) a silicone lubricant having an average molecular weight not less than 40,000 and being present in an amount not less than 0.01 parts and not greater than 10 parts based on 100 parts of the base polymer(s); and (C) a slip aid comprising a saturated amide, an oxidized polyethylene, or mixture thereof; the slip aid being in an amount not less than 0.01 parts and not greater than 8 parts based on 100 parts of the base polymers(s).

Polymers, copolymers, and blends thereof which are conventionally known for use as matrix polymers for closures and sealants are contemplated for use in the present invention.

The present invention is also directed to a lubricant/slip-aid composition for use in container closures and closure sealants. An exemplary slip aid composition comprises: a silicone lubricant (e.g., siloxane, organosiloxane) having an average molecular weight greater than 40000, the silicone being present in an amount of 0.01 parts—10 parts based on 100 parts of matrix polymer(s) and a slip aid comprising a saturated amide, an oxidized polyethylene, or mixture thereof.

Further advantages and features are described in further detailed hereinafter.

DETAILED DESCRIPTION OF EXEMPLARY EMBODIMENTS

As summarized above, exemplary compositions comprise a matrix polymer having essentially no erucamide or unsaturated amide; a silicone lubricant; and slip aid having a saturated amide, oxidized polyethylene, or mixture thereof.

The matrix polymer, copolymer, or blend thereof may be selected from those conventionally known for use in making containers, container closures, or closure sealants. For example, these include thermoplastic polymers such as polyethylene or ethylene copolymer with other lower alkenes, polypropylene, thermoplastic rubbers, ethylene propylene copolymers, acid modified ethylene propylene copolymers, styrene butadiene rubber, carboxylated styrene butadiene block copolymer, polyisoprene, styrene isoprene styrene block copolymers, styrene butadiene styrene block copolymers, styrene ethylene butylene styrene block copolymers, polystyrene block polyethylene/propylene copolymers, polystyrene block polyethylene propylene polystyrene copolymers, polystyrene block polyethylene ethylene propylene styrene copolymers polystyrene, ethylene vinyl acetate copolymers and terpolmers, ethylene acrylate co and terpolymers ethylene vinyl alcohol copolymers, butyl rubber, ethylene acid copolymers, and polyvinyl chloride polymers.

Compositions of the invention should be essentially free of erucamide and which is essentially free of unsaturated amide. In other words, amides contained in the composition should have an iodine value no greater than 10 and more preferably no greater than 5. The iodine value is a measure of the unsaturation of alkyl groups and can be measured using the Wjis procedure, such as ASTM D2075-92, among others.

Typical examples for closure liners are described in, for instance, U.S. Pat. No. 5,104,710, EP 0478109, EP 0599356, EP 0488491, and 0646158. The liners may be applied to the closure in any of the known methods, such as those described in, for example, U.S. Pat. No. 4,518,336, EP 207385, and U.S. Pat. No. 4,277,431.

Typical examples for closures are described in, for example, U.S. Pat. No. 5,045,594, U.S. Pat. No. 5,186,991, U.S. Pat. No. 6,399,170, WO 0162837, EP 73334, and U.S. Pat. No. 4,462,502.

The addition of silicones to container closure and closure sealant compositions are not new, and examples of can be found in EP 129309. However, they are used in conjunction with an unsatured amide(s) to provide the ability to lessen removal torque.

In further embodiments of the invention, at least one siloxane may be used. For example, Japanese Patent Applicant No. 2000038495 described a high molecular weight siloxane as a slip aid in cap liners. However, the present inventors believe that the use of siloxanes alone are ineffective at providing sufficient ability to reduce removal torque and furthermore have the problem of polymer scuffing.

In further exemplary embodiments of the invention, a silicone can be used as a process aid. See e.g., EP 0331485. Preferred silicone lubricants are siloxanes available from Dow Corning under the trade names of DC 200® FLUID. Preferably, the viscosity of such siloxanes is greater than 50,000 cst. A particularly preferred material is also available from Dow Corning under the trade name of Si Powder Resin Modifiers and MB Master Batches, for instance, MB 50–320. The siloxanes are generally used in the range of 0.01 to 10 parts by weight based on 100 parts total polymer, the preferred range being 0.01 to 5 parts by weight based on 100 parts total polymer.

Slip aids are used to reduce the force required to remove the closure from a bottle or package. There can be found in the literature examples of the use of unsaturated amides, See e.g., JP 2002068282, U.S. Pat. No. 5,929,128, JP 02191166. However, the present inventor believes that the use of a saturated amide in a container closure or closure sealant is new. Saturated amides which are believed suitable for use in the present invention include behenamide, arachidamide, stearamide, palmitamide, myristamide, and lauramide. These are commercially available from Croda Universal. The term "saturated" as used herein shall mean to compositions wherein the iodine value is no greater than 10 and more preferably no greater than 5.

Secondary saturated bis-amides are also believed to be suitable slip aids for use in the present invention. For example, ethylene bis-stearamide is commercially available as from Croda Universal under the tradename CRODA EBS. A preferred amide for use in the present invention is stearamide.

Oxidized polyethylenes, with or without the saturated amide, are also believed to be suitable slip aids for use in the present invention. These are commercially available from Honeywell under the tradename A-C, one particularly preferred version being named or otherwise denominated "A-C 629A." The typical ranges of both these types of slip aides are 0.01 to 8 parts based on 100 parts of the base polymer(s).

Optional components for use in the compositions and methods of the invention include pigments, antioxidants, stabilizers, hydrocarbon oils, phthalate ester plasticizers, epoxidized soybean oil, foaming agents, acrylic processing aides, fillers, and nanocomposites. Additionally active packaging components may be included such as oxygen scavengers, aldehyde scavengers, anti-microbials, and flavor enhancing agents.

Exemplary compositions of the invention may be formed, such as by molding, into beverage or food containers, closures, or closure sealants such as cap linings.

The present invention also provides slip aid compositions. An exemplary slip aid composition for use in container closures and closure sealants, comprises: a silicone (e.g., a siloxane, an organosiloxane such as poly(dimethyl)siloxane, etc.) having an average molecular weight not less than 40,000; the silicone being present in an amount not less than 0.01 parts and not greater than 10 parts based on 100 parts of said base polymer(s); and a slip aid comprising a saturated amide, an oxidized polyethylene, or mixture thereof; said slip aid being in an amount not less than 0.01 parts and not greater than 8 parts based on 100 parts of said base polymer(s).

The foregoing embodiments and examples are provided for purposes of illustration only and are not intended to limit the scope of the invention. In the examples, the following abbreviations are used:

| | |
|---|---|
| EVA | Ethylene-vinyl acetate copolymer, 14% VA |
| EP | Ethylene propylene copolymer |
| ER | Crodamide ER |
| SR | Crodamide SR |
| EBS | Crodamide EBS |
| Si1 | Dow Corning 200 fluid, 60000 cst |
| Si2 | Dow Corning 200 fluid, 100000 cst |
| Si3 | Dow Corning MB50-320 |
| AO | antioxidant |
| BLUE | pigment |
| OXP | Oxidized Polyethylene |

EXAMPLE 1

The compositions in table 1, below were blended, extruded into films, and 1 inch discs punched out. The discs were then inserted into 28 mm polypropylene caps designed for carbonated soft drink applications. The caps were then applied to 20 oz. PET bottles filled with water using a commercial application machine. The bottles were stored at room temperature for less than week and greater than 24 hours, after which, the force required to remove the cap was measured and any tearing, scuffing or stringing of the liner was noted.

TABLE 1

| | A | B | C | D | E | F | G |
|---|---|---|---|---|---|---|---|
| EVA | 90 | 90 | 90 | 90 | 90 | 90 | 90 |
| EP | 10 | 10 | 10 | 10 | 10 | 10 | 10 |
| AO | 0.1 | 0.1 | 0.1 | 0.1 | 0.1 | 0.1 | .1 |
| BLUE | 0.8 | 0.8 | 0.8 | 0.8 | 0.8 | 0.8 | .8 |
| ER | 0 | 1 | 0 | 0 | 0 | 0 | 0 |
| EBS | 0 | 0 | 1.5 | 0 | 0 | 0 | 0 |
| SR | 0 | 0 | 0 | 1.5 | 0 | 0 | 0 |
| OXP | 0 | 0 | 0 | 0 | 1 | 0 | 0 |
| Si1 | 0 | 0 | 0 | 0 | 0 | 1 | 0 |
| Si2 | 0 | 0 | 0 | 0 | 0 | 0 | 0 |
| Si3 | 0 | 0 | 0 | 0 | 0 | 0 | 2 |
| Removal Torque, in-lbs. | >23.6 | 10.6 | >24.2 | 20 | 20.6 | 16.7 | 13.2 |
| Stringing/Scuffing | 100% | 10% | 70% | 80% | 40% | 100% | 100% |

As shown above, no one lubricant or slip aid alone provided the same degree of performance as erucamide. Stringing and/or scuffing of the liner was believed be be caused from the bottle surface tearing the liner. In the food and beverage industry, this is deemed unacceptable as it can cause pack contamination. An insufficient lubrication/slip property on the surface of the liner will cause this to worsen.

EXAMPLE 2

In accordance with the procedure described above for Example 1, the following compositions were applied to caps and tested, as shown in Table 2 below.

TABLE 2

| | A | B | C |
|---|---|---|---|
| EVA | 90 | 90 | 90 |
| EP | 10 | 10 | 10 |
| AO | .1 | .1 | .1 |
| BLUE | .8 | .8 | .8 |
| Si3 | 3 | 3 | 0 |
| Si2 | 0 | 0 | 1.5 |
| SR | 0 | 1 | 1 |

TABLE 2-continued

|  | A | B | C |
|---|---|---|---|
| OXP | 1.5 | 0 | .5 |
| REMOVAL TORQUE, IN-LB. | 13.6 | 10.3 | 12.0 |
| STRINGING/ SCUFFING | 0% | 0% | 14% |

This data indicates that by utilizing a mixture of siloxanes and ethylenically saturated amides and/or oxidized polyethylene, in combination, provided performance equal to that of erucamide.

EXAMPLE 3

In another example, compositions similar to above were extrusion blended and pelletized. The pellets were then melted in another extruder, and the molten pellets were transferred directly from the extruder to the individual cap and immediately compression-molded.

The resulting lined caps were allowed to age at room temperature for a minimum of 1 week prior to testing. The caps were then applied to 20 oz. PET bottles filled with water using a commercial application machine. The bottles were stored at 40° F. for less than week and more than 24 hours. After this period, tests were performed to measure the force required to remove the cap, and any tearing, scuffing or stringing of the liner was noted.

Compositions containing a siloxane in conjunction with an ethylenically unsaturated amide and/or an oxidized polyethylene slip aid gave removal torques comparable to compositions containing erucamide. Stringing was judge to be commercially acceptable by industry standards. However, a composition using a siloxane alone without an unsaturated amide and/or oxidized polyethylene gave unacceptably high removal torque and stringing.

By utilizing a mixture of siloxanes and ethylenically unsaturated amides and/or oxidized polyethylene, in combination, performance equal to that of erucamide was obtained by compositions of the present invention.

The foregoing embodiments and examples were provided for illustrative purposes only and not intended to limit the scope of the invention.

I claim:

1. A composition, comprising:
   (A) a matrix polymer, copolymer, or blend thereof, which is essentially free of erucamide, which is essentially free of unsaturated amide, and which is operative to provide a container, container closure, or closure sealant, said matrix polymer, copolymer, or blend thereof being selected from thermoplastic polymers consisting of polyethylene or ethylene copolymer with other lower alkenes, polypropylene, thermoplastic rubber, poly (ethylene propylene) copolymer, acid modified ethylene propylene copolymer, styrene butadiene rubber, carboxylated styrene butadiene block copolymer, polyisoprene, styrene isoprene styrene block copolymer, styrene butadiene styrene block copolymer, styrene ethylene butylene styrene block copolymer, polystyrene block polyethylene/propylene copolymer, ethylene vinyl acetate copolymer or terpolmer, ethylene acrylate copolymer or terpolymer, ethylene vinyl alcohol copolymer, butyl rubber, and poly(vinyl chloride) polymer;
   (B) a lubricant comprising an organopolysiloxane, said organopolysiloxane having an average molecular weight not less than 40,000, said organosiloxane being present in said composition in an amount not less than 0.01 parts and not greater than 10 parts based on 100 parts of said matrix polymer, copolymer, or blend thereof which comprises said component (A), and said organopolysiloxane having a viscosity of at least 50.000 cst; and
   (C) a slip aid comprising a saturated amide and an oxidized polyethylene, said slip aid being present in said composition in an amount not less than 0.01 parts and not greater than 8 parts based on 100 parts of said component (A), said amide having an iodine value no greater than 5 in accordance with ASTM D2075-92;
   said composition when employed in a container, container closure, or closure sealant providing reduced off-tastes while maintaining slip-aid efficiency when compared to compositions containing unsaturated amide.

2. The composition of claim 1 comprising at least two of said thermoplastic polymers or copolymers.

3. The composition of claim 1 wherein said matrix polymer, copolymer, or mixture thereof comprises an ethylene vinyl acetate copolymer in an amount not less than 5 parts and not greater than 100 parts, based on 100 parts of said component (A).

4. The composition of claim 1 wherein said matrix polymer, copolymer, or mixture thereof comprises polyethylene, polypropylene, or blend thereof.

5. The composition of claim 4 wherein said matrix polymer, copolymer, or mixture thereof comprises a copolymer of polyethylene and polypropylene.

6. The composition of claim 1 wherein said organopolysiloxane is poly(dimethyl) siloxane.

7. The composition of claim 1 wherein said saturated amide is selected from the group consisting of behenamide, stearamide, arachidamide, palmitamide, myristamide, lauramide and ethylene bis-stearamide.

8. The composition of claim 7, wherein said saturated amide is stearamide.

9. The composition of claim 7 wherein said saturated amide is behenamide.

10. The composition of claim 1 being molded into a beverage container.

11. The composition of claim 1 being molded into a beverage container closure.

12. The composition of claim 11, wherein said beverage container closure is a plastic cap.

13. The composition of claim 1 being molded into a cap liner.

14. The composition of claim 1 wherein said matrix polymer comprises ethylene vinyl acetate copolymer, and further comprises poly(ethylene propylene copolymer).

15. The composition of claim 1 wherein said ethylene vinyl acetate copolymer or terpolymer and said poly (ethylene propylene) copolymer constitute 100% of said matrix polymer.

16. The composition of claim 14 wherein said saturated amide is stearamide.

17. The composition of claim 16 wherein said organopolysiloxane is poly(dimethyl)siloxane.

18. The composition of claim 1 wherein said matrix polymer comprises poly(vinyl chloride) polymer.

19. The composition of claim 18 wherein said poly(vinyl chloride) polymer constitutes 100% of said matrix polymer.

20. The composition of claim 1 wherein said matrix polymer comprises polyethylene, polypropylene, or mixture thereof; and said matrix polymer further comprises styrene ethylene butylene styrene block copolymer.

* * * * *